United States Patent [19]

Gould

[11] Patent Number: 4,492,669
[45] Date of Patent: Jan. 8, 1985

[54] METHOD AND MEANS FOR MAKING A BERYLLIUM MIRROR

[75] Inventor: Gerald Gould, Bethel, Conn.

[73] Assignee: The Perkin-Elmer Corporation, Norwalk, Conn.

[21] Appl. No.: 476,945

[22] Filed: Mar. 21, 1983

[51] Int. Cl.³ ............................. B22F 3/14; B22F 7/06
[52] U.S. Cl. ........................................ 419/5; 164/230; 164/232; 419/49
[58] Field of Search ....................... 419/5, 49; 164/230, 164/232

[56] References Cited

U.S. PATENT DOCUMENTS

| | | | |
|---|---|---|---|
| 3,531,848 | 10/1970 | Gripshover et al. | 419/5 |
| 3,841,870 | 10/1974 | Hamiian | 419/49 |
| 3,982,934 | 9/1976 | Wentzell | 419/49 X |

FOREIGN PATENT DOCUMENTS 130405  10/1981  Japan ................................ 419/49

Primary Examiner—Leland A. Sebastian
Attorney, Agent, or Firm—Edwin T. Grimes; Thomas P. Murphy; Francis L. Masselle

[57] ABSTRACT

A uniform reticulated intrastructure (56) is placed in a container (58) and surrounded by beryllium powder (72). After closing the container (58) and applying heat and pressure, a hardened form is taken out of the container. The intrastructure (56) is then removed leaving a lightweight solid beryllium body (72) suitable for use as a mirror (52). Means (62, 66) are provided to control the spacing of the intrastructure elements during the forming process.

2 Claims, 7 Drawing Figures

METHOD AND MEANS FOR MAKING A BERYLLIUM MIRROR

BACKGROUND OF THE INVENTION

Metal mirrors have been gaining increased acceptance for a variety of applications because they may be made lightweight, have high stiffness to weight ratio, and have high stability. They are often easy to fabricate and mount and have good thermal conductivity. Also, they are generally not frangible and require relatively short fabrication cycles.

In the past, high quality metal mirrors have been produced by hogging out of a single wrought or hot pressed slab of stock. As the trend for higher quality and lightweighting have progressed, the method of fabricating mirrors has taken an entirely new direction. Numerous thin sections have been entirely gas pressure diffusion bonded for super lightweighting. Mirrors have also been brazed for water cooling passages. In the past, monolithic mirror blanks for more isotropic requirements were cast and plated on the mirror surface to mask the imperfections.

It is known that beryllium may be made into a product which is inherently reflective and used as a mirror. In prior beryllium mirrors, powders have been used and after suiable heating and pressurization, the external surface of the formed articles were suitably machined and polished. Generally, the initial body was a block of material, which had to be machined to the proper shape.

One of the disadvantages of the aforementioned beryllium product is that there are limitations to what can be machined from a solid block. A second disadvantage is that the structure of beryllium is anisotropic. Under these conditions, after the powder is hot pressed, the properties in the vertical direction differ from those in the horizontal direction. This effects the final figure of the mirror so that small temperature excursions cause the mirror to change more in one direction than the other due to this anisotropy. The use of very fine beryllium powder with the proper morphology ameliorates this problem, facilitating equal compaction in all directions.

Beryllium mirrors, when properly constructed, are useful in reflecting long wave and infrared signals. In general, when beryllium mirrors are used in large sophisticated systems, it is important to maintain the figure of the mirror in adverse environments. Such adverse environments, for example, may involve laser or bomb flashes.

It is desirable to have beryllium mirrors relatively lightweight with good thermal properties. These objects are obtainable through the use of hollow substructures. Providing a mirror with hollow areas therein for lightweight and using very fine beryllium powders require special mandrels which are used for the formation of the product but which then must be removed. During the compression of the fine powder, it is important that the spacing between the mandrels and compressed powder be maintained in some predetermined relationship. Consequently the shapes of the mandrels used and their spaced relationship with respect to each other is an important consideration. Spacing of the elements making up the main body of the mandrel is necessary in order to receive the powder for forming the interior structure of the mirror after the mandrel elements are removed.

OBJECTS OF THE INVENTION

It is an object of this invention to provide an improved method for making monolithic mirrors and especially lightweighted and/or reticulated mirror structures.

It is a further object of this invention to provide an improved method for making mirrors from powder by hot isostatic pressing.

It is still a further object of this invention to provide an improved substructure which enhances accuracy and homogeneity in the formation of the mirror and which may be designed for passive cooling and/or a liquid or gas cooled intrastructure.

It is still a further object of this invention to provide an improved method of producing mirrors by hot isostatic pressing which is applicable to any metal, pure or alloyed, which can be produced or converted to powder (i.e.: Al, $M_o$, Ti, C and their alloys) as well as any ceramic powders which can be similarly consolidated.

BRIEF SUMMARY OF THE INVENTION

In accordance with the present invention, a lightweight beryllium mirror is formed by first placing a uniform reticulated structure, which serves as removable mandrels in a container. The structure is then surrounded by fine beryllium powder. The assembly is then subjected to hot isostatic pressing. After removal from the container, the reticulated structure is removed by etching or other means to leave a beryllium body having hollow areas therein, suitable for use as a lightweight mirror. The reticulated structure may comprise spaced honeycomb elements, with the spacing therebetween being accurately controlled by a plurality of spacer pins.

Other objects and advantages of the present invention will be apparent and suggest themselves to those skilled in the art from a reading of the following specification and claims taken in conjunction with the accompanying drawings.

DETAILED DESCRIPTION OF THE PREFERRED EMBODIMENTS

Figure 1:
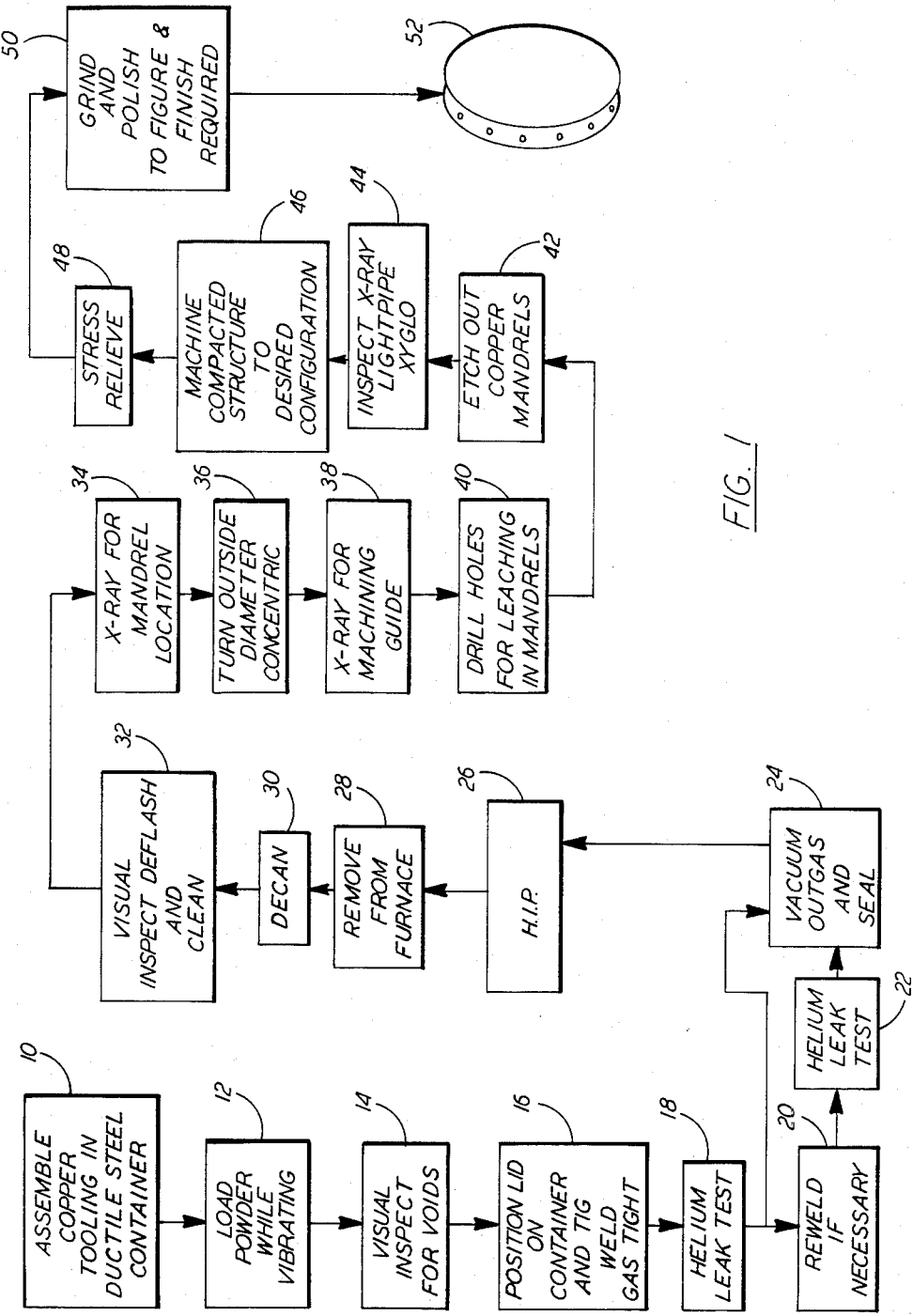
FIG. 1 is a block diagram illustrating the steps in the process for making a lightweight beryllium mirror.

Referring particularly to FIG. 1, in order to form a beryllium mirror a tooling or removable mandrel assembly is first formed as indicated by step 10. The beryllium powder is then loaded into the container, see step 12, by continuous or intermittent dispensing, until the container is completely filled. The entire can and tooling are vibrated during this filling operation to insure compaction and the elimination of voids (air pockets) and/or bridging of the powder particles. As will be described, the copper tooling involved in step 10 is actually an assembly of smaller elements having spacing therebetween so that the beryllium powder completely surrounds the tooling and is disposed between the individual elements in the spaces therebetween as will be described.

After the beryllium powder is relatively compacted by vibration, as indicated in step 12, and visually inspected as per step 14, a cover is put on the container and TIG welded gas tight as indicated by step 16. After the cover has been suitably welded onto the main container, a test is taken to assure that there is no leakage from the container as indicated by step 18. The results of the test is noted, and if the container is not sufficiently tight, the cover of the container is repaired or rewelded as indicated in step 20. Another test for outgassing and sealing takes place at a station illustrated by step 22.

The sealed container is then completely outgassed by a suitable vacuum pump and sealed off carefully to preclude any air from reentering the container. This takes place as indicated at station 24.

The entire assembly including the tooling and beryllium powder in the container is now ready to be subjected to a hot isostatic pressing operation as indicated in step 26.

Hot isostatic pressing per se has been used in the past. In such processes, the materials involved are subjected to extremely high temperatures and pressures. Utilizing an autoclave whose uniform gas pressure would isostatically compress the container while the heating elements inside the autoclave supply heat to the container as required.

The heating elements, inert gas and controls are conventional to hot isostatic pressing furnaces and therefore will not be described any further in detail.

After the container including the beryllium powder and tooling has been compressed, it is removed from the furnace as indicated by step 28. The container or cover is then removed from the beryllium body which includes the mandrel therein as indicated by step 30. The resulting body or blank is then visually inspected, deflashed and cleaned as indicated by step 32. The next step required is to locate the mandrel body within the beryllium, which is the copper tooling referred to in step 10. This step involves taking an X-ray, for example, as illustrated in step 34. The outside diameter of the body is then turned as indicated by step 36. The body is then X-rayed again to define the accurate locations of the subsurface tooling prior to further machining, as indicated in step 38 in order to drill holes into the beryllium body to provide means to reach the mandrel to permit a leaching or etching operation, as indicated in step 40.

After the holes have been drilled in the beryllium body, the mandrel or copper tooling is etched out, or otherwise removed, by any suitable means as indicated by step 42. Following the removal of the mandrel or copper tooling, the beryllium body is inspected as indicated by step 44. The final steps in the process then involve the machining of the mirror to the specified design configuration as shown in step 46.

Stress relieving as indicated in step 48 and then grinding and polishing to final specifications as shown in step 50.

Following all the steps previously enumerated, a final product representing a reflective beryllium mirror, step 52, is achieved.

In order to achieve a monolithic compaction of powdered beryllium with precision uniform results, it is necessary to provide precise rigid structures for mandrels. Removable mandrels are used in order to permit the final beryllium body to include a number of hollow areas essential to producing a lightweight structure.

A problem arises in providing the type of rigid structure which is suitable for use as a removable mandrel and still provide the precision necessary as the body including the powder and mandrel is being compressed under high pressures and temperatures. For example, the compaction of the mandrel body must bear a predetermined relationship with respect to the compaction of the powder. Furthermore, the mandrel or mandrel elements making up the main body of the mandrel must provide sufficient spacing throughout the beryllium body to be formed so as to provide the support for the beryllium body after the mandrel has been removed.

While a particular type of tooling is illustrated in the subsequent figures, the present invention is not limited specifically to the precise type of tooling illustrated. Specifically, the so-called sacrificial tooling used in the present invention comprises a network of relatively small elements. These elements must be separated from each other so as to permit the beryllium powder to pass therebetween with the spacing being maintained during the compression of the beryllium powder.

In the present invention, as the compression of the beryllium powder is taking place, the mandrel elements must move inwardly with respect to each other. In the compression step, there must be a relationship with respect to the entire mandrel assembly as compared with the compression rate of the beryllium.

Figure 2:
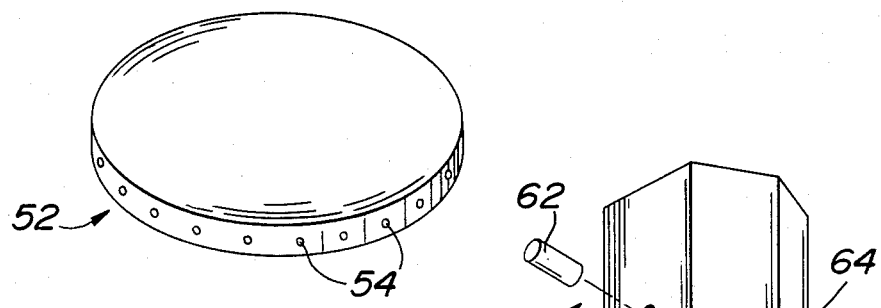
FIG. 2 is an isometric view of one type of beryllium mirror which may be formed by the process illustrated in FIG. 1.

FIG. 2 is an enlarged view of the final formed beryllium mirror 52. The mirror includes a plurality of openings 54. These are the openings drilled in the beryllium body to permit removal of the mandrel. A relatively large number of openings (not illustrated) are drilled in the bottom surface of the mirror to further facilitate removal of the mandrel by etching or the like, as in step 40 of FIG. 1.

Figure 4:
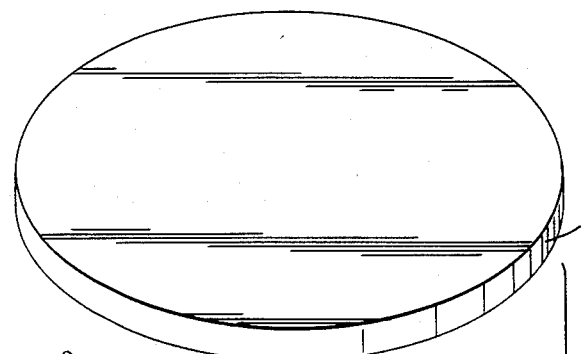
FIG. 4 is an isometric exploded view illustrating one of the hexagon elements and associated pins of a type which may be used to make up a uniform reticulated structure for use as a removable mandrel.
Figure 3:
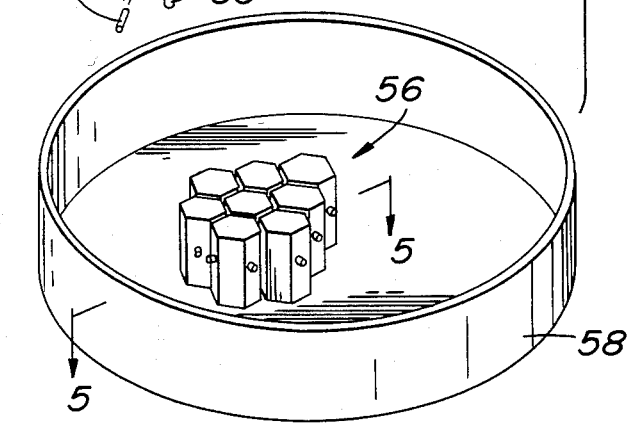
FIG. 3 is an exploded view illustrating a uniform reticulated structure used as a mandrel disposed in a container prior to the addition of beryllium powder and other steps in the fabricating process.

Referring to FIGS. 3 and 4, the copper tooling referred to in step 10 of FIG. 1 includes a substructure or mandrel 56 which comprises a uniform reticulated intrastructure placed in a container 58. The substructure 56 includes a plurality of hexagon shaped elements 60. Each of the elements include three spacer pins 62 disposed to loosely fit into recesses 64 in alternate sides of the hexagon element. In addition, each hexagon element 60 includes a single pin 66 disposed to fit into a recess 68 in the bottom of the element 60.

Figure 5:
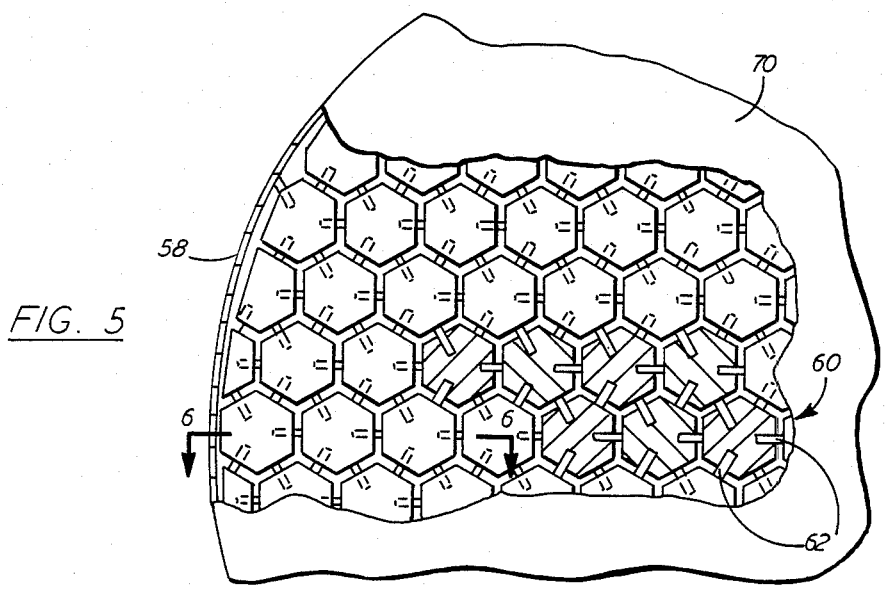
FIG. 5 is a view, with the cover partly broken away, illustrating the arrangement of all the parts and materials in a container when heat and pressure are applied thereto.

As also illustrated in FIG. 5, the pins 62 provide the spacing between the hexagon elements. The lengths of the pins 62 are dimensioned so that they go partly into the recesses 64 so that the extending ends of the pins contact flat sections of adjacent hexagon elements. The loosely fitting pins 62 in the recesses of the hexagon elements maintain the spacing between the hexagon elements as the beryllium powder in the container 58 is being compressed.

The bottom pins 66 in recesses 68 provide space on the bottom of the structure 56 and provides means for drilling and removing the mandrels after the beryllium body is formed.

After the beryllium powder has been added to the container 58, a cover 70 is welded thereon. This was the step 18 illustrated in FIG. 1.

FIG. 5 illustrates the various positions of the material, tooling and container during the hot isostatic pressing operation illustrated as step 26 in FIG. 1. The spaced hexagon elements 60 are disposed within the container 58, with the cover 70. Spacing between the elements 60 are provided by the spacer pins 62 to receive beryllium powder therebetween.

Figure 6:
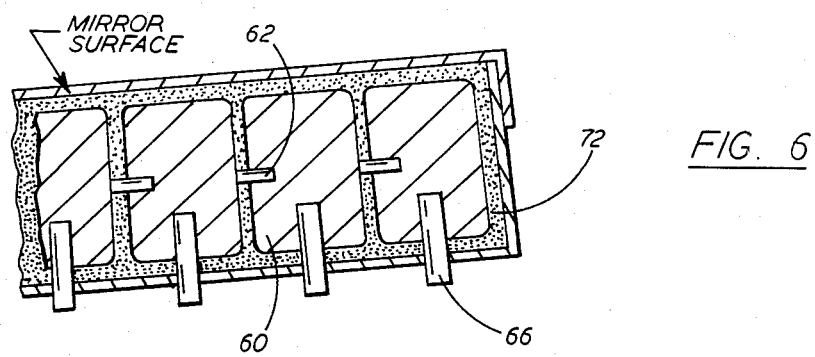
FIG. 6 is a cross-sectional view taken along lines 6—6 of FIG. 5.

FIG. 6 illustrates the beryllium powder 72 in the spacing between the hexagon elements 60. The positions of the pins 62 are illustrated in this figure. The pins 66 disposed towards the bottom of the beryllium body to be formed are also illustrated.

Figure 7:
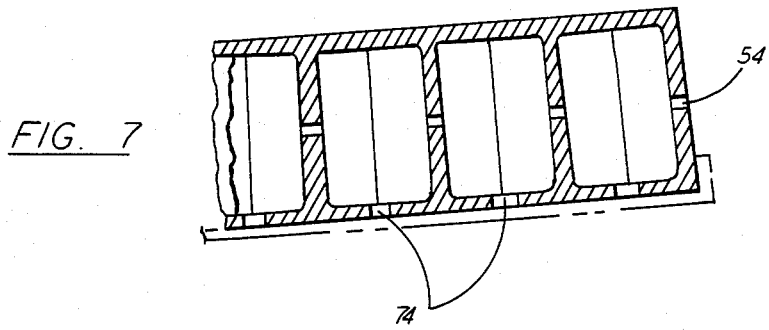
FIG. 7 is a cross-sectional view, partly broken away, of a cross-section of the formed beryllium mirror after the mandrels have been removed.

FIG. 7 illustrates the final form of the beryllium body or mirror after the mandrels comprising the hexagon elements have been removed, as illustrated in step 42 of FIG. 1. It is noted that the final formed body includes bottom openings 74 as well as the side openings 54. These are the openings which permit the tooling to be removed and to leave a lightweight monolithic beryllium body having a number of interconnected hollow areas therein (a reticulated substructure).

I claim:

1. A process for forming a monolithic mirror from fine powder comprising the steps of;
   (a) providing an open container,
   (b) placing a plurality of hollow, hexagonal shaped elements in said container,
   (c) precisely spacing each of said hexagonal shaped elements from one another by pins disposed in recesses through alternate surfaces of said hexagonal shaped elements,
   (d) special positioning each of said hexagonal shaped elements vertically by pins disposed in recesses in the bottom of each of said hexagonal shaped elements,
   (e) placing said fine powder in the spaces between said elements,
   (f) closing said container,
   (g) hot isostatically pressing said closed container,
   (h) removing said container to provide a blank including said powder and said plurality of hexagonal shaped elements,
   (i) drilling holes about the periphery of said blank communicating with said hexagonal shaped elements,
   (j) inserting a leaching fluid into said holes and recesses for removing all of said hexagonal shaped elements and pins.

2. A substructure for providing a removable mandrel for a hot isostatic pressing operation of beryllium powder comprising;

a plurality of hexagonal shaped cells disposed to be placed in a container and surrounded by said beryllium powder with the powder disposed in the spaces between said cell members, alternate side surfaces of each of said cell members having pins disposed therein to maintain precisely the spaces between said cell members for receiving said powder when said powder is subjected to heat and pressure, a removable pin disposed in recesses through the bottom surface of each of said cell members for maintaining precise vertical position of each cell member and to permit leaching fluid to be inserted through said recesses after said powder is subjected to heat and pressure.

* * * * *

REEXAMINATION CERTIFICATE (927th)
United States Patent [19]
Gould

[11] B1 4,492,669
[45] Certificate Issued Sep. 27, 1988

[54] METHOD AND MEANS FOR MAKING A BERYLLIUM MIRROR

[75] Inventor: Gerald Gould, Bethel, Conn.

[73] Assignee: The Perkin-Elmer Corporation, Norwalk, Conn.

Reexamination Request:
No. 90/001,354, Oct. 20, 1987

Reexamination Certificate for:
Patent No.: 4,492,669
Issued: Jan. 8, 1985
Appl. No.: 476,945
Filed: Mar. 21, 1983

[51] Int. Cl.⁴ .......... B22F 3/14; B22F 7/06; B22F 3/24; B22C 7/06
[52] U.S. Cl. .......... 419/5; 419/26; 419/49; 428/118; 428/304.4; 249/177; 249/184; 164/230; 164/232; 264/58
[58] Field of Search .......... 419/5, 8, 26, 49; 249/177, 184; 264/58; 350/320; 428/67, 116, 118, 188, 223, 304.4, 312.8; 164/230, 232

[56] References Cited
U.S. PATENT DOCUMENTS
214,270 4/1879 Woodruff.
3,290,421 12/1966 Miller, Jr.

OTHER PUBLICATIONS

"HIP Fabrication of Experimental Mirror Substructure", Mueller, presented at Beryllium 1977 Intl. Conference, Oct. 4-7, 1977.
Final NASA Report on "Techniques For Fabricating Rocket Engine Components Containing Intricate Flow Channels", Goldstein et al, Aug. 1, 1969.
"Optical Application of Beryllium", Paquin et al, presented at Beryllium 1977 Intl. Conference, Oct. 4-7, 1977.

Primary Examiner—John F. Terapane

[57] ABSTRACT

A uniform reticulated intrastructure (56) is placed in a container (58) and surrounded by beryllium powder (72). After closing the container (58) and applying heat and pressure, a hardened form is taken out of the container. The intrastructure (56) is then removed leaving a lightweight solid beryllium body (72) suitable for use as a mirror (52). Means (62, 66) are provided to control the spacing of the intrastructure elements during the forming process.

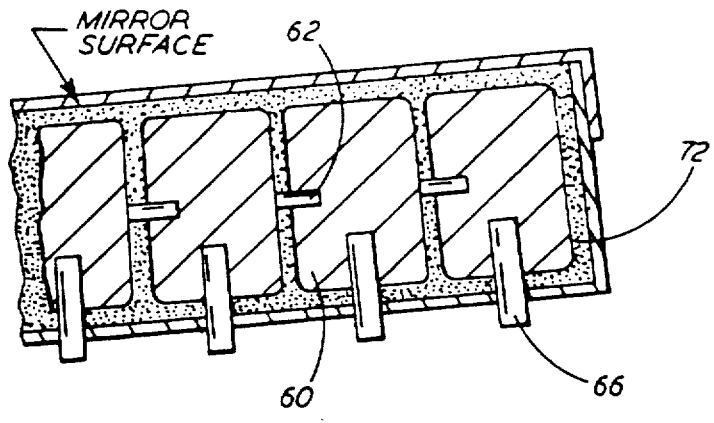

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 and 2 is confirmed.

* * * * *